July 10, 1951          R. W. ALLEN          2,560,030

AIRPLANE LANDING GEAR

Original Filed July 9, 1943          6 Sheets-Sheet 1

Inventor
Raymond W. Allen
By Ely & Frye
Attorneys

July 10, 1951  R. W. ALLEN  2,560,030
AIRPLANE LANDING GEAR
Original Filed July 9, 1943  6 Sheets-Sheet 2

Inventor
Raymond W. Allen
By Ely + Frye
Attorneys

R. W. ALLEN

2,560,030

AIRPLANE LANDING GEAR

Original Filed July 9, 1943

Inventor
Raymond W. Allen

By Ely & Frye

Attorneys

July 10, 1951 R. W. ALLEN 2,560,030
AIRPLANE LANDING GEAR
Original Filed July 9, 1943 6 Sheets-Sheet 6

Inventor
Raymond W. Allen
By Ely & Frye
Attorneys

Patented July 10, 1951

2,560,030

UNITED STATES PATENT OFFICE

2,560,030
AIRPLANE LANDING GEAR

Raymond W. Allen, Akron, Ohio, assignor to The Firestone Tire & Rubber Company, Akron, Ohio, a corporation of Ohio Original application July 9, 1943, Serial No. 494,107, now Patent No. 2,459,737, dated January 18, 1949. Divided and this application December 22, 1948, Serial No. 66,715

13 Claims. (Cl. 305—10)

This invention relates to airplane landing gear, and more especially it relates to landing gear of the character wherein endless tracks of the so-called "caterpillar" type are substituted for the pneumatic tires commonly used with landing gear for aircraft, and this application is a division of my co-pending application, Serial No. 494,107, filed July 9, 1943, now Patent No. 2,459,737.

Aircraft landing gear of the type having endless tracks mounted upon pivoted and articulated supporting structures are old and well known in this art, but those developed heretofore have serious disadvantages and limitations which the present invention remedies. The landing gear shown herein is highly efficient and is particularly advantageous for use with very heavy planes which land at high speeds. It is also superior to prior constructions in that it will permit a heavy, high speed plane to land and take off safely on very rough and uneven terrain. While earlier forms of landing gears have sought to achieve this result, the landing gear shown herein is more efficient and effective. It is also better adapted for use on wet and muddy fields than other forms of landing devices.

Other objects of the invention are to provide airplane landing gear of the caterpillar type capable of taking off and landing at higher speeds than heretofore possible and to provide a structure of the character mentioned capable of absorbing the higher impact forces resulting from such higher speeds.

Another object of the invention is to provide for keeping the endless track taut while the airplane is running on the ground either in landing or taxiing.

More specifically the landing gear of the invention aims to provide a bogie construction that will support a portion of the load; to provide articulated bogies so that the track will follow the uneven contour of the ground; to provide a flexible support for the bogies to enable efficient operation thereof; and to provide means compensating for the lengthening of the track due to tension when a heavy load is applied. Other objects will be manifest as the description proceeds.

Figure 1:
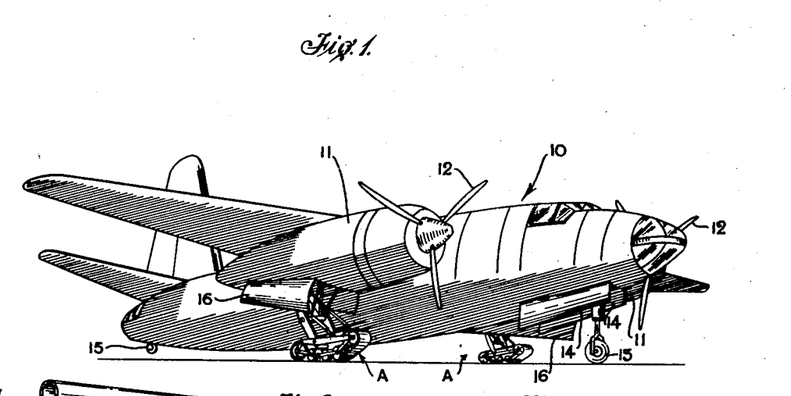
Fig. 1 is a perspective view of a grounded airplane, and landing gear embodying the invention supporting the same.

Referring to Fig. 1 of the drawings, there is shown an airplane 10 of the bomber type comprising nacelles 11, 11 mounted upon the wings thereof. Within the nacelles are the motors that drive the propellers 12 of the airplane. Near its nose the airplane is provided with a retractible landing wheel 13, which wheel is shown in operative or lowered position, the doors 14, 14 of its compartment being open. The tail wheel of the craft is shown at 15. Within each nacelle 11, rearwardly of the motor therein, is a compartment or bay within which is mounted a retractible landing gear that is designated as a unit by the character A and which is an embodiment of the present invention. The landing units A are shown in the lowered or operative position they assume when supporting the airplane upon the ground, the doors 16, which close the compartments of the landing units A when the latter are in retracted or flying position, being shown open. Within each nacelle is a triangular framework 17, shown in broken lines in Figs. 6, 7 and 8, to which a landing unit A is attached and which may represent a retractible support for the landing gear, but as said framework is not part of the present invention, a more comprehensive showing thereof is not necessary. Fig. 9 illustrates the landing units in retracted position within nacelle 11.

Pivotally connected at 19 to one corner of the triangular framework 17 is an arm 20 and pivotally connected at 21 to another corner of the framework 17 is a somewhat longer arm 22.

The arms 20, 22 have their lower ends pivotally connected at 23 and 24, respectively, to an arm 25 that is obliquely disposed with relation to the horizontal with its upper end disposed rearwardly. The pivotal connection 23 is at the upper end of arm 25 and the pivotal connection 24 is located intermediate the ends of the arm, but somewhat nearer the lower end. The arms 20, 22 and 25 constitute a flexible strut or undercarriage structure that carries the track portion of the landing gear, and also carries a shock absorbing element that absorbs much of the shock incidental to landing of the airplane, and also prevents rebound thereof. The shock absorbing element, shown at 26 in the drawings, is of conventional telescoping type employing a heavy fluid in the manner of a dashpot, one end of said element being pivotally connected to the arms 22 and 25 at the pivot point 24 and the other end of the element being pivotally connected to the arm 20 at 27, intermediate the ends of the later but somewhat near pivotal connection 19. The arrangement is such that the arms 20, 22 and 25 assume the relative angular position best shown in Figs. 7 and 8 when the undercarriage is under load, as when the airplane is on the ground, and assume the relative angular positions shown in Fig. 6 when the airplane is off the ground with landing gear in extended landing position, the shock absorbing element 26 being so positioned as yieldingly to oppose sudden change in the relative positions of said arms.

Figures 2, 3:
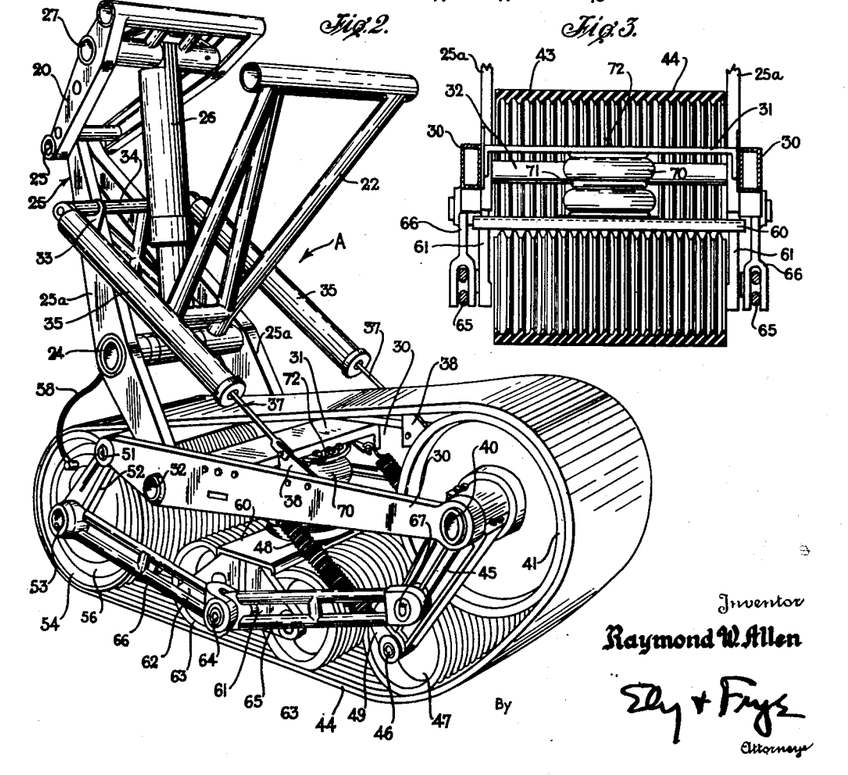
Fig. 2 is a perspective view, on a larger scale, of landing gear such as shown in Fig. 1.
Fig. 3 is a section, on a smaller scale, on the line 3—3 of Fig. 4.
Figure 6:
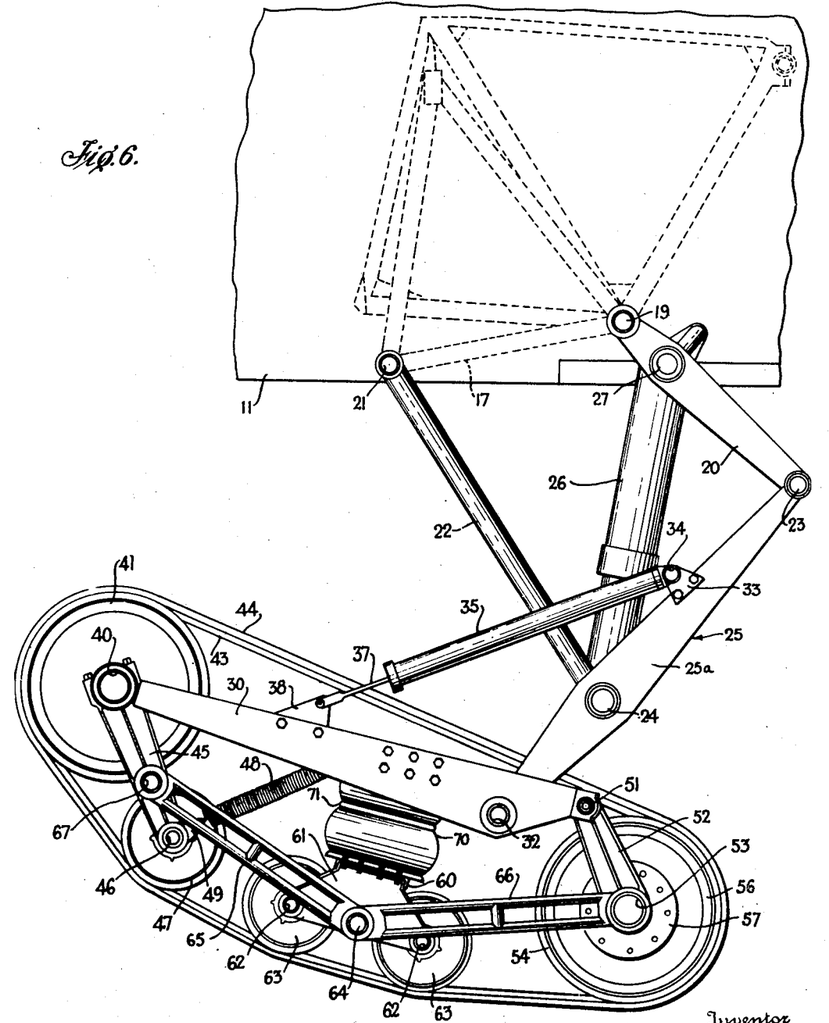
Fig. 6 is a side elevation of the landing gear in extended position it assumes when the plane is in the air and ready for landing.

The track portion of the landing gear or the track unit comprises a framework or frame member consisting of parallel, spaced-apart, hollow, side rails 30, 30 that are permanently connected to each other intermediate their ends by a transverse brace or plate 31. Between the brace 31 and the rear ends of the side rails 30 the latter carry a transversely extending shaft 32 to which the lower end of the arm 25 is pivotally connected. As is best shown in Fig. 2, the arm 25 is a truss-like structure having two lateral members 25a, 25a, the lower ends of the latter being spaced apart so as to connect with the shaft 32 at opposite end portions thereof, and being positioned beside the inner lateral faces of the respective side rails 30. Preferably the shaft 32 is hollow to reduce weight. The track portion of the landing gear is arranged to be carried in determinate angular position with relation to the arm 25 at times when there is no load on said track portion. When the landing gear is extended preparatory to landing, the track portion will be somewhat oblique with relation to horizontal, its leading end being elevated as compared to its trailing end. This position of the track portion is shown in Fig. 6. For yieldingly holding the track portion to the angular position mentioned, the lateral members 25a of arm 25 are provided, between pivot points 23, 24, with upstanding brackets 33 that support a hollow transverse bar or shaft 34. The latter projects from opposite sides of said arm 25, and to each projecting end portion thereof is swivelled the rear end of a cylinder 35. In each cylinder 35 is a compression spring 36, Fig. 4, and a rod 37 engaged with said spring and projecting from an apertured closure on the front end of said cylinder. The outer end of each rod 37 is pivotally connected to an anchor bracket 38 secured to a side rail 30 between the pivot point or shaft 32 and the forward end of the rail, which is the right end thereof as shown in Fig. 2 and the left end thereof as shown in Figs. 4 to 8. The structures consisting of the cylinders 35, springs 36 and rods 37 support the overbalanced weight of the track unit which would otherwise cause the track unit to drop into a vertical position. This device will permit the track unit to swing upwardly about the pivot 32 in riding over an obstruction, as shown in Fig. 8, and when the plane lands, the load applied to the rear portion of the track will cause the toggle formed by the lever 25 and the frame 30 to straighten out, thus bringing down the forward end of the track unit, the spring being further compressed during this movement.

Figure 5:
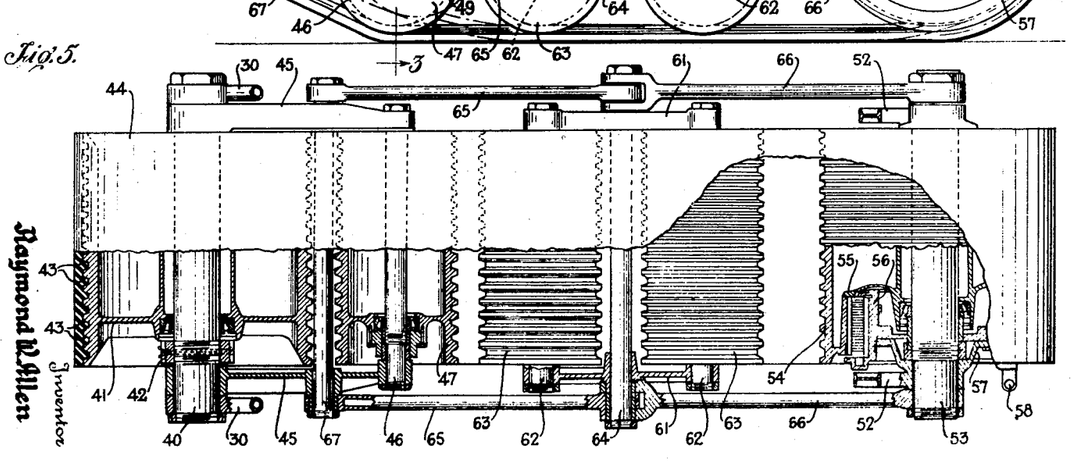
Fig. 5 is a plan view of the structure shown in Fig. 4, a portion thereof being in section on line 5—5 of Fig. 4.

Fixedly mounted in the forward extremity of the side rails 30 and supported at its ends thereby is a hollow axle 40, and journaled thereon, between said end rails, is a relatively large, hollow wheel or drum 41. Collars, such as the collar 42, Fig. 5, are mounted on the axle 40 and retain the drum 41 centrally of the axle in spaced relation to the side rails 30. The periphery of the drum is formed with a plurality of circumferentially extending V-shaped grooves adapted frictionally to engage with complementally shaped ribs 43, 43, Figs. 5 and 10, formed on the inner face of an endless band track or caterpillar element 44, constituting the ground-engaging member of the landing gear. Journaled on the axle 40 between the collars 42 and side rails 30 are arms 45, which arms extend obliquely downwardly and rearwardly and have their lower or free ends connected by a hollow axle 46. A relatively small hollow wheel or drum 47 is journaled on the axle 46, the periphery of the drum being formed with circumferentially extending V-shaped grooves in which the ribs 43 of the endless track 44 are receivable. The free ends of the arms 45 normally are yieldingly urged rearwardly by tension springs 48, each of which is connected at one end to a fixed point on the cross-brace 31, see Fig. 2, and has its other end connected to a metal clip 49 secured upon a projecting end portion of the axle 46, beside arm 45.

A hollow shaft 51 is fixedly mounted in the rearward extremity of the side rails 30, and journaled on said shaft between said side rails and adjacent the latter are arms 52 which extend obliquely downwardly and rearwardly, substantially in parallelism with the arms 45, and have their lower, free ends connected by a hollow axle 53. Journaled upon the axle 53 between arms 52 is a hollow wheel or drum 54 of substantially the same diameter as the drum 41 at the front end of the landing gear, the periphery of said drum being formed with V-shaped grooves in which the ribs 43 of the endless track 44 are receivable. As shown in Fig. 5, the drum 54 is provided interiorly at one end with a brake of the conventional fluid pressure operated friction disc type. The hub and rim portion of the drum are connected by an annular structure 55 that carries one set of brake-discs, the other set being carried by an annular fixture 56 that is bolted to a flange 57 formed on the arm 52. Pressure fluid for actuating the brake is connected to the latter by a flexible conduit 58 that connects with a suitable port formed in said fixture 56. Obviously a similar brake could be provided at the other end of the drum, which brake would be connected in parallel with the fluid supply conduit 58. When the landing gear is applied to aircraft carrying heavier loads, the forward drum 41 also may be equipped with braking means.

Positioned between the drum 47 and the drum 54 is a bogie comprising a flat top plate 60 and end plates 61, 61 that are of trapezoidal shape, the top plate being secured to the shorter of the parallel sides of the end plates. The end plates 61 carry two hollow axles 62, 62, and journaled on said axles are hollow wheels or drums 63. The bogie wheels 63 are identical with each other and preferably are identical with the drum 47. The periphery of each wheel 63 is also formed with the V-shaped grooves for the endless track 44. Journaled in bearings in each end plate 61 is a shaft 64, the ends of which project laterally beyond said end plates. Pivotally connected to each of the projecting end portions of shaft 64 are two links 65 and 66, which links extend forwardly and rearwardly, respectively, both of the links on either side of the structure being disposed in the same vertical plane. The rear end of each of the rearwardly extending links 66 is pivotally connected to a projecting end portion of the rear axle 53 of the structure, and the front ends of the links 65 are pivotally connected at a midway point to the arms 45 by the shaft 67. The arrangement is such that the links 65, 66 maintain the bogie in proper relative position in a fore and aft direction, yet enable the bogie to rise or fall relatively of the cross-brace 31, and to tilt angularly about the shaft 64 for a purpose presently to be explained. It will be observed that the links 65 and 66 extend somewhat upwardly from the shaft 64 to shaft 67 and axle 53, and are at an angle to each other so as to act as a toggle against the arms 45 and 52 when the bogie is moved up or down with relation to the side rails 30.

The bogie is disposed directly below the crossbrace 31, and positioned between the latter and the top plate 60 of the bogie and secured to each of them is a pneumatic spring element comprising a bellows-shaped structure 70. The structure 70 is centrally disposed with relation to the sides of the landing gear and is composed of flexible, impervious material. It is preferably formed with a medial circumferential reduced or constricted region, which region is encircled by an inextensible metal girdle ring 71. Valve 72 is provided for inflating the bellows structure with compressible fluid such as air, the air within the bellows being maintained at sufficient pressure to enable the bogie to support its proper proportionate share of the load on the landing gear. The arrangement provides ready means by which the landing gear may be adjusted to support loads of various weights. Furthermore, the inflated bellows urges the bogie toward the lower reach of the endless track 44 and maintains the latter taut when there is no load on the landing gear.

Figure 4:
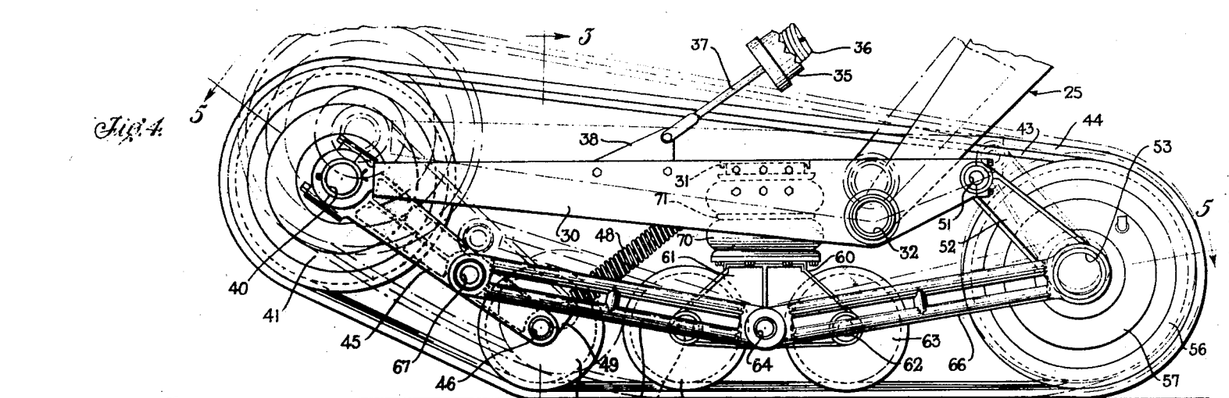
Fig. 4 is a side elevation of the track portion of the landing gear, shown in full lines under load on a level surface.

During flight each landing unit A is carried within closed nacelle 11 of the airplane 10, but preparatory to landing is lowered to the position shown in Fig. 6. It will be observed that the shock-absorbing element 26 is in extended condition and holds the undercarriage structure consisting of the arms 20, 22 and 25 in somewhat open position. Furthermore, the compression springs in the cylinders 35 hold the entire track portion of the landing gear in somewhat tilted position so that the lower or ground-engaging reach of the endless track 44 is inclined upwardly with relation to the horizontal, toward the forward or leading end of the landing gear. Thus in landing upon level ground, contact is first made near the rear drum 54 of the gear, and then progressively forwardly toward the drum 47 as more load is applied to the gear, the arrangement being such that the probability of nosing over, due to the striking of small obstructions, is reduced. In Fig. 4 the position of the track structure in loaded position on level ground is shown in full lines, the relative positions of the various elements in unloaded condition, as in flight, being indicated in broken lines.

Figure 7:
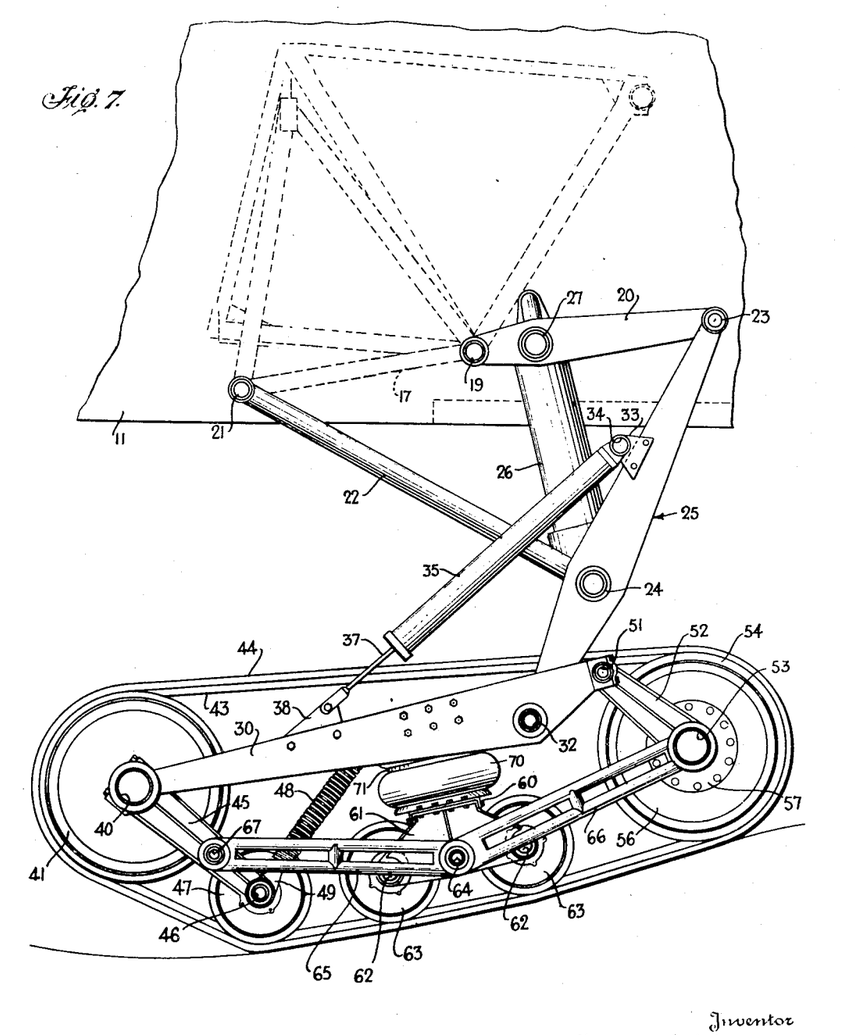
Fig. 7 is a side elevation of the structure shown in Fig. 6 as it appears under full load on a downwardly inclined surface.
Figure 8:
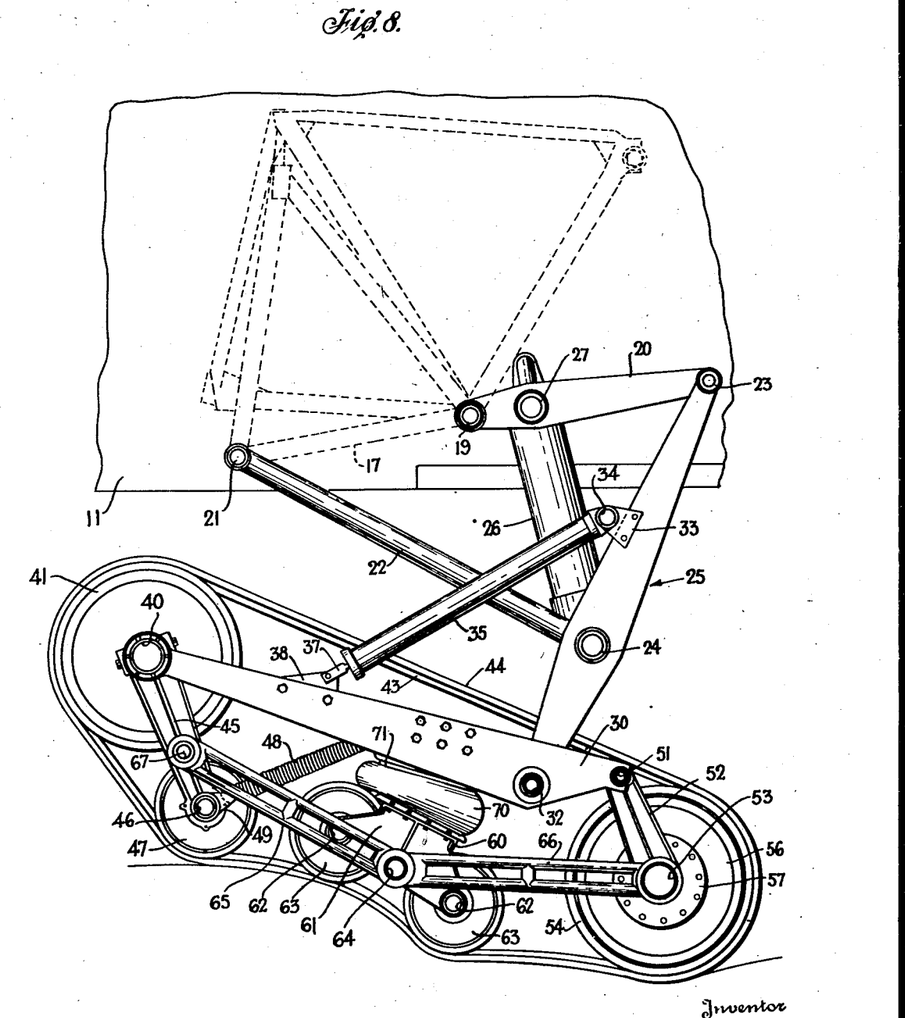
Fig. 8 is a side elevation of the structure shown in Figs. 6 and 7 as it appears when fully loaded and passing over an obstruction on the ground.
Figure 9:
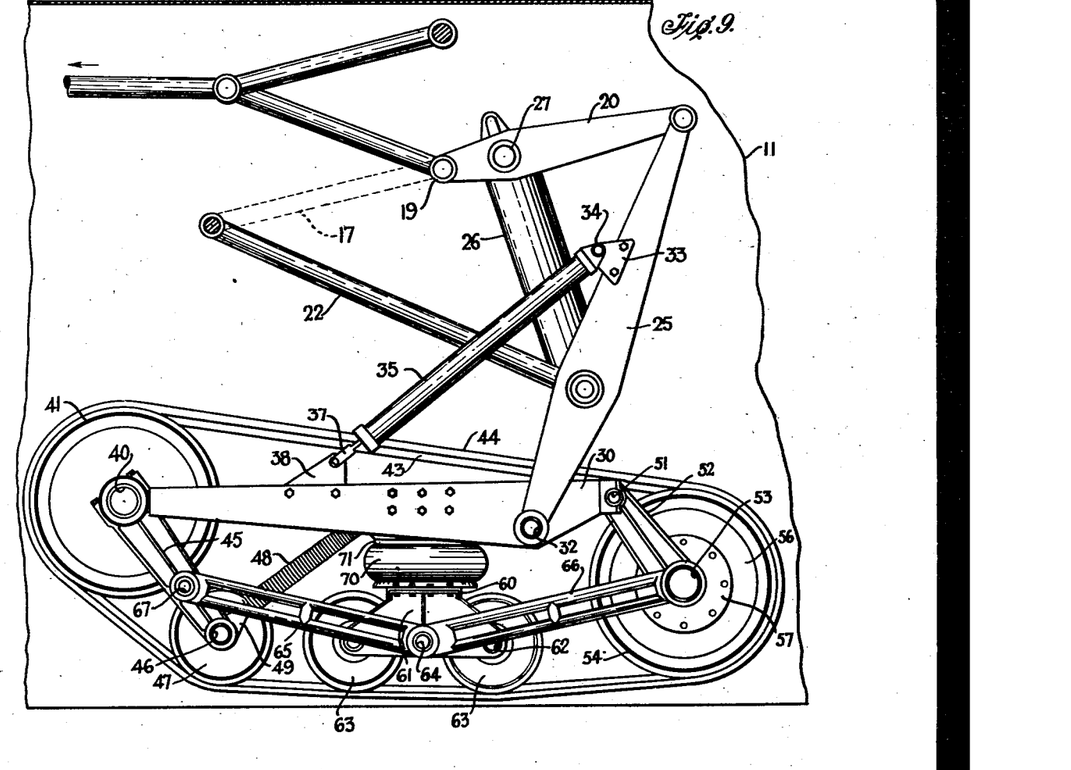
Fig. 9 is a side elevation partly in section illustrating the retracted position of the landing gear.

The major portion of landing impact is absorbed in the shock absorber 26 as the arms 20, 22 and 25 move from the positions shown in Fig. 6 to the positions such as shown in Fig. 7 or 8. A minor, but appreciable portion of the impact is absorbed in the track portion of the landing gear, especially by the endless band track itself. It will be apparent that the impact of landing will result in the swinging of the arms 45 and 52 rearwardly. This would result in a slackening in the normal tension in the endless track 44 were it not for the action of the bogie. Impact with the ground causes the side rails 30 to move downwardly relatively of the bogie with the result that the links 65, 66 connected thereto act as toggles to force the free ends of the arms 45 and 52 away from each other, with the result that greater than normal tension is imparted to the endless track, which tension supplements the force absorbed by the deforming of the pneumatic cushion 70 in cushioning the landing impact. The feature of automatically imparting additional tension to the endless track upon landing also is advantageous in that it counteracts centrifugal force in the track as it is driven rapidly over the ground. It is also advantageous in keeping the track in tight frictional engagement with the drums 41 and 54 so that braking force applied to the latter will be efficiently transmitted to the track.

Since the weight of the airplane is applied to the side rails 30 of the landing gear at 32, forwardly of the rear axle 53, the nose or leading end of the gear moves downwardly against the force of the springs in cylinders 35, so that the lower reach of the track is in contact with the ground over a large area. The action is shown in Fig. 4, where the freely suspended position of the track unit is shown in dotted lines and the loaded position in full lines.

The arrangement by which the bogie may swivel or tilt about the shaft 64 is especially advantageous when moving over rough ground, as shown in Fig. 8, since it enables both bogie wheels to maintain normal engagement with the endless track and prevents undue slackening of the tension in the latter. Moreover, the use of a deformable pneumatic spring member such as the bellows 70 enables substantially maximum downward pressure to be exerted on the bogie at all times, notwithstanding the various angular positions the latter may assume. The forward roller 47 will yield in going over obstructions, its upward movement being resisted by the cushion 70 through the toggle mechanism. The spring 48 acts as a balance for the cushion 70. The drum 54 also has the ability to yield, through the cushion 70. As the several rollers 47, 63 and 54 have considerable freedom of movement, the device will accommodate itself to all manner of rough and uneven ground.

Figure 10:
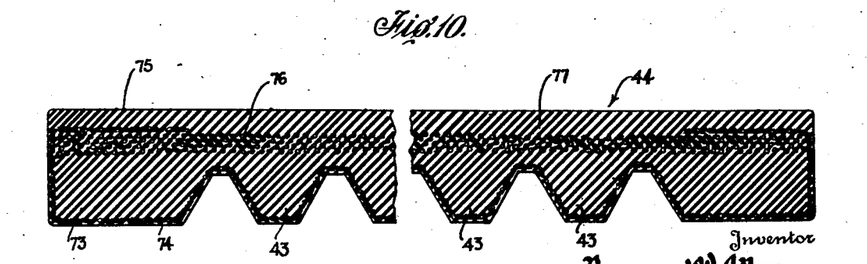
Fig. 10 is a sectional detail of the endless band track.

The track 44 as illustrated in detail in Fig. 10 has a thin, flexible, molded rubber body structure 73, a frictional inner facing of rubberized fabric 74, a tread 75 of tough, abrasion-resistant rubber compound, and a reinforcing structure of flexible stranded steel wires 76 embedded in the gum plies 77, the whole being vulcanized in annular form as an integral body. The wires are small flexible cables placed closely together. These cables, which are spaced approximately 14 to the inch, are made up of a plurality of strands of very fine wire, the complete cable being approximately .030" in diameter. The cables which have been found to give the best results are made of what is known as fine tire wire with the specifications as 7/3/.0058. As a result the wire reinforcement is very flexible so that it will not cut through the belt. A belt so constructed will withstand the high speeds to which the track is subjected on landing.

Because the endless tracks 44 having a much greater area of contact with the ground than have the pneumatic tires such as usually are employed on landing gear, it follows that the braking effort of the present invention will have greater mechanical advantage than braking applied to wheels equipped with pnumatic tires. Thus, airplanes equipped with the improved landing gear of the invention may land at higher speeds than airplanes not so equipped, or they may land on fields provided with shorter runways.

The shaft 32, where the caterpillar track unit is pivotally connected to the undercarriage structure, is disposed rearwardly of the center of gravity of the track unit and the ground-contacting area of the track, with the result that the possibility of "nosing over" upon landing is further reduced.

It will also be noted that the arrangement is such that the track and its reticulated supporting structure will conform to the surface of the terrain more effectively and safely than previous landing gears of this general type. Thus, in Fig. 7 is shown the position which the track unit assumes when the ground slopes downwardly and forwardly, while Fig. 8 shows the position which is assumed on an upwardly sloping terrain or in going over obstructions. The fact that the forward drum 41 is elevated above the contact area of the track enables the device to climb over obstacles. The superior flexibility of the structure which absorbs the irregularities of all types of rough ground greatly reduces any tendency of the plane to upset or nose over during landing or taking off on very rough and uneven ground. This is all accomplished without danger of the structure throwing its landing track, as is often the case with previous landing gears of this type.

It will be understood that the means shown for spreading the main track carrying drums may be altered, it being possible to employ other means responsive to the load for spreading the drums under load or to take up any loosening of the belt by centrifugal force while under load.

While the specifications of the wire reinforcement given above have been found to be highly satisfactory and efficient, it will be understood that these details may be modified, it being essential to maintain a very flexible construction which will, however, have the requisite strength. It will also be noted that by the provision of a plurality of ribs of equal size and spacing, the belt may shift on the rolls and pulleys to a considerable extent without actual loss of the belt as any rib will seat properly within any groove and the belt still be serviceable.

Other modifications may be resorted to without departing from the spirit of the invention or the scope thereof as defined by the appended claims.

What is claimed is:

1. A track-laying landing gear for aircraft, comprising a rigid frame, a first roller journaled on said frame, a first pair of arms pivoted on said frame, on an axis spaced from the axis of said roller, journal means on said frame intermediate the axis of pivoting of said arms and the axis of said roller, for pivotal mounting of gear-retracting mechanism of an aircraft, a second roller mounted for rotation between said pair of arms on an axis spaced from the axis of pivoting of said arms, a second pair of arms pivoted on said frame on the opposite side of the said journal means from said first pair of arms, a third roller mounted for rotation between said second pair of arms on an axis spaced from the axis of pivoting thereof, toggle means interconnecting said first pair of arms with said second pair of arms, and a resilient connection between said frame and an intermediate part of said toggle means and offset from said journal means.

2. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame in spaced relation to said journal means, toggle means interconnecting said lever systems, and resilient means interconnecting said frame and an intermediate part of said toggle means.

3. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame in spaced relation to said journal means, toggle means interconnecting said lever systems, and resilient means interconnecting said frame and an intermediate part of said toggle means, said resilient means including a bogie pivoted on said toggle means and mounting a pair of track rollers.

4. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame in spaced relation to said journal means, toggle means interconnecting said lever systems, and resilient means interconnecting said frame and an intermediate part of said toggle means, said resilient means including a fluid-containing bellows and a bogie pivoted on said toggle means and mounting a pair of track rollers.

5. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame in spaced relation to said journal means, toggle means interconnecting said lever systems and attached to one of said lever systems between its mounted roller and the said frame, and resilient means interconnecting said frame and an intermediate part of said toggle means.

6. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame in spaced relation to said journal means, toggle means interconnecting said lever systems and being attached to an intermediate part of that one of the said lever systems lying on the same side of the said journal means as the last-mentioned track roller, and resilient means interconnecting said frame and an intermediate part of said toggle means.

7. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame co-axially with the pivot axis of one of said lever systems, toggle means interconnecting said lever systems, and resilient means interconnecting said frame and an intermediate part of said toggle means.

8. In a device as in claim 5, resilient means urging said one of said lever systems toward the said frame, in opposition to the first-mentioned resilient means.

9. A track-laying landing gear for aircraft, comprising a rigid frame, track rollers mounted for rotation on a pair of lever systems pivoted on spaced axes on said frame, journal means on said frame, intermediate said axes, for pivotal mounting of the gear-retracting mechanism of an aircraft, another track roller journaled on said frame in spaced relation to said journal means, toggle means interconnecting said lever systems and attached to one of said lever systems between its mounted roller and the said frame and to the other of said lever systems co-axially with its mounted roller, and resilient means interconnecting said frame and an intermediate part of said toggle means.

10. A track-laying landing gear for aircraft comprising a rigid frame, track rollers mounted for rotation on arms pivoted on axes spaced along said frame, journal means on said frame, intermediate said axes and adjacent one of said arms, for pivotal mounting of the gear-retracting mechanism of an aircraft, a track roller journaled on said frame for rotation about one of said axes, a toggle mechanism articulated to one of said arms co-axially with the roller mounted thereon and to the other of said arms intermediate the roller mounted thereon and its axis of pivoting, resilient means attached to the frame and to an intermediate part of said toggle linkage, said resilient means comprising a spring, and a bogie pivoted on said toggle mechanism and carrying a pair of track rollers.

11. A device as in claim 10, said resilient means being so positioned that the said arms at all times form acute angles with the line adjoining their pivot axes.

12. A device as in claim 10, said resilient means being so positioned that the said arms at all times form acute angles with the line joining their pivot axes, the arm pivoted co-axially with a track roller being directed generally toward said journal means, and the other arm being directed generally away from said journal means.

13. A device as in claim 10, spring means connecting said other of said arms to said frame and acting in opposition to said resilient means.

RAYMOND W. ALLEN.

REFERENCES CITED

The following references are of record in the file of this patent:

UNITED STATES PATENTS

| Number | Name | Date |
|---|---|---|
| 1,480,078 | Kegresse | Jan. 8, 1924 |
| 1,831,012 | Kornbeck | Nov. 10, 1931 |
| 2,041,599 | Fergusson | May 19, 1936 |
| 2,281,351 | Dowty | Apr. 28, 1942 |
| 2,416,183 | Kraft | Feb. 18, 1947 |

FOREIGN PATENTS

| Number | Country | Date |
|---|---|---|
| 432,868 | Great Britain | Oct. 30, 1933 |
| 571,024 | Great Britain | Aug. 2, 1945 |

OTHER REFERENCES

"Flight," magazine for September 30, 1943.
Richmond (Va.) Times-Dispatch for July 24, 1943.